(12) United States Patent
Kikuchi et al.

(10) Patent No.: US 7,006,182 B2
(45) Date of Patent: Feb. 28, 2006

(54) LIQUID CRYSTAL DISPLAY DEVICE

(75) Inventors: Katsuhiro Kikuchi, Nara (JP); Ikuji Konishi, Nara (JP); Toshiyuki Tanaka, Nara (JP); Kanae Suenaga, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/689,086

(22) Filed: Oct. 21, 2003

(65) Prior Publication Data

US 2004/0085273 A1    May 6, 2004

(30) Foreign Application Priority Data

Nov. 6, 2002   (JP)   ............................. 2002-322014

(51) Int. Cl.
*G02F 1/1335* (2006.01)
(52) U.S. Cl. ...................... 349/114; 349/106
(58) Field of Classification Search ................ 349/114, 349/106
See application file for complete search history.

(56) References Cited

U.S. PATENT DOCUMENTS

| | | | |
|---|---|---|---|
| 6,195,140 B1 | 2/2001 | Kubo | |
| 6,281,952 B1 | 8/2001 | Okamoto et al. | |
| 6,476,889 B1 | 11/2002 | Urabe et al. | |
| 6,839,105 B1 * | 1/2005 | Tanaka et al. | 349/110 |
| 6,894,745 B1 | 5/2005 | Fujimori et al. | |
| 2002/0003596 A1 | 1/2002 | Kim | |
| 2002/0113927 A1 | 8/2002 | Ha et al. | |
| 2003/0063244 A1 | 4/2003 | Fujimori et al. | |
| 2003/0117551 A1 | 6/2003 | Fujimori et al. | |

FOREIGN PATENT DOCUMENTS

| | | |
|---|---|---|
| JP | 11-101992 | 4/1999 |
| JP | 2001-042332 A | 2/2001 |
| KR | 2001-0076336 A | 8/2001 |

OTHER PUBLICATIONS

Korean Office Action mailed Sep. 28, 2005 in corresponding Korean application no. 2003-0078236.
Taiwanese Office Action mailed Jul. 4, 2005 in corresponding Taiwanese application no. 09420608520.

* cited by examiner

*Primary Examiner*—Dung T. Nguyen
*Assistant Examiner*—Tai Duong
(74) *Attorney, Agent, or Firm*—Nixon & Vanderhye P.C.

(57) ABSTRACT

In a transmission/reflection combination type LCD that includes a CF substrate having a counter electrode part; a TFT substrate having a reflection pixel electrode part and a transmission pixel electrode part and disposed to oppose the CF substrate; and a liquid crystal layer interposed between these substrates, each pixel has a reflection region and a transmission region, and includes a convex for making the thickness of the liquid crystal layer smaller in the reflection region than in the transmission region. The convex is provided not on the TFT substrate but on the CF substrate, so that the downstream end of the convex can be disposed in a position shifted toward the upstream side along the rubbing direction relatively to the reflection pixel electrode part disposed on the TFT substrate. Accordingly, lowering of display quality in the transmission region due to a domain formed in a region of the liquid crystal layer correspondingly to a shade portion shaded from the rubbing processing with the convex can be suppressed without sacrificing the numerical aperture of the transmission region.

6 Claims, 6 Drawing Sheets

Rubbing direction on TFT substrate

LIQUID CRYSTAL DISPLAY DEVICE

FIELD OF THE INVENTION

The present invention relates to a liquid crystal display device (LCD) including a transmission/reflection combination type liquid crystal display panel. This type of LCD is used in, for example, a cellular phone, a PDA (personal digital assistance), on-vehicle equipment (such as a navigation system) and amusement equipment (such as a game machine).

DESCRIPTION OF THE RELATED ART

Recently, LCDs are widely used, owing to their features of having a small thickness and consuming low power, in OA appliances such as a word processor and a personal computer, portable information apparatuses such as a portable electronic scheduler, and a monitor for a camera-incorporated VTR.

The LCDs are roughly classified into two categories, that is, a reflection type and a transmission type. Specifically, since an LCD is not a selfluminous display device such as a CRT (Braun tube) or an EL (electroluminescence), a display is produced by using light emitted from an illuminator (that is, a so-called backlight) disposed behind a liquid crystal display panel in the transmission type and a display is produced by using ambient light in the reflection type.

The advantages and the disadvantages of the respective types are as follows: A transmission type LCD is advantageously so less affected by the ambient brightness that a bright display with a high contrast ratio can be produced, but disadvantageously consumes large power due to its backlight (which consumes approximately 50% or more of the whole power consumption). Furthermore, its visibility is disadvantageously lowered in a very bright atmosphere (such as the outdoors in fine weather), or when the brightness of the backlight is increased for keeping the visibility, the power consumption is further increased. On the other hand, a reflection type LCD is advantageous in its very small power consumption because it does not need a backlight, but its display brightness and contrast ratio are disadvantageously largely affected by the use condition such as the ambient brightness. In particular, its visibility is extremely lowered in a dark atmosphere.

Accordingly, in order to attain the advantages of both of these types while eliminating the disadvantages thereof, an LCD that has a function to produce displays in both reflection and transmission display modes has been proposed.

Figure 6:
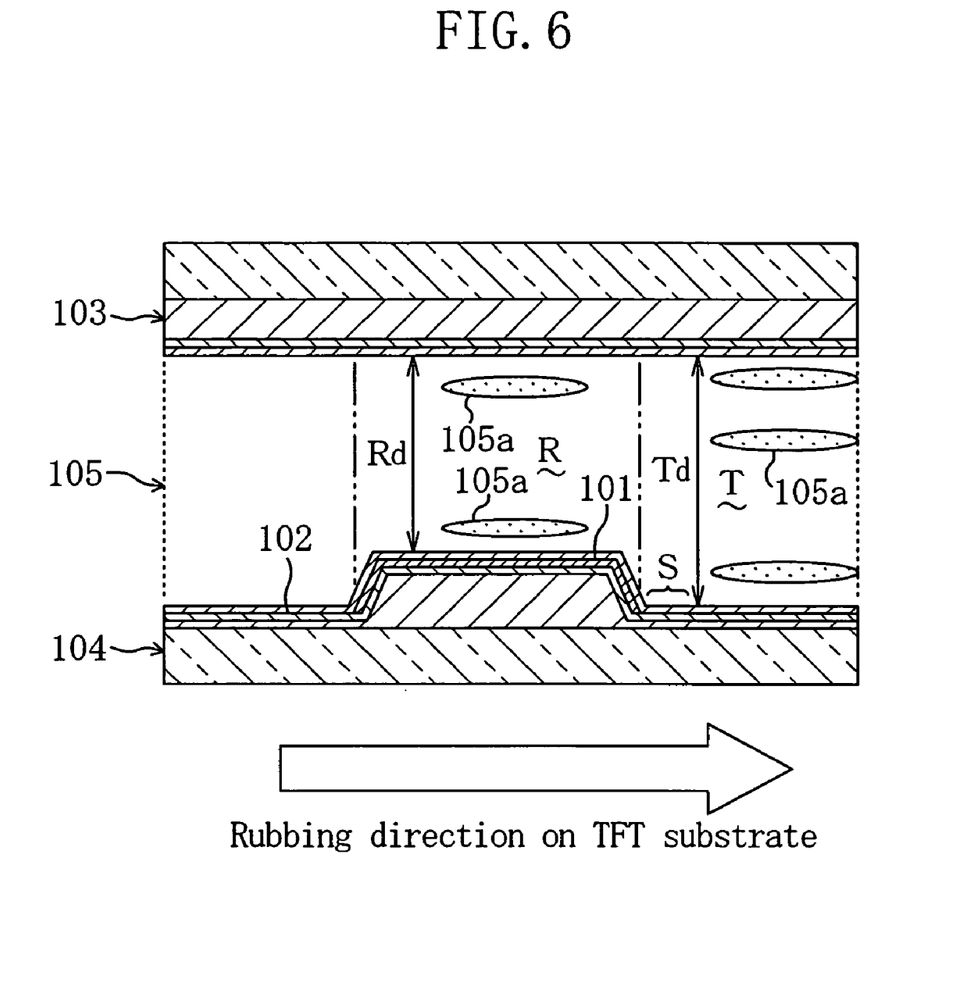
FIG. 6 is a schematic cross-sectional view of a main part of a liquid crystal display panel of a conventional LCD.

Each pixel of such a transmission/reflection combination type LCD includes, as schematically shown in a cross-sectional view of FIG. 6, a reflection pixel electrode part 101 for reflecting the ambient light entering in the downward direction in the drawing and a transmission pixel electrode part 102 for transmitting light of a backlight entering in the upward direction in the drawing. Therefore, a display can be produced in the both display modes, or alternatively, a display can be produced in either mode switched between the transmission display mode and the reflection display mode in accordance with the use condition (namely, the ambient brightness). Accordingly, a transmission/reflection combination type LCD has the advantage of the reflection type LCD, that is, the small power consumption, as well as the advantages of the transmission type LCD, that is, being less affected by the ambient brightness and being capable of producing a bright display with a high contrast ratio. In addition, the disadvantage of the transmission type LCD, that is, lowering of the visibility in a very bright atmosphere, is suppressed.

In the above-described transmission/reflection combination type LCD, with respect to the thickness of a liquid crystal layer 151 interposed between a counter electrode substrate 103 and a pixel electrode substrate 104, the thickness Rd in a reflection region R should be approximately a half as large as the thickness Td in a transmission region T ($Rd \approx Td \times \frac{1}{2}$). Therefore, conventionally, a convex 106 is provided in the reflection region on the pixel electrode substrate 104 and the reflection pixel electrode part 101 is disposed on the convex 106 as described in Japanese Laid-Open Patent Publication No. 11-101992 (corresponding to U.S. Pat. No. 6,195,140) and Japanese Laid-Open Patent Publication No. 2001-42332.

SUMMARY OF THE INVENTION

In the above-described conventional LCD, however, when the pixel electrode substrate 104 is subjected to the rubbing processing, a portion S of the pixel electrode substrate 104 shaded with the convex 106 from the rubbing processing (hereinafter simply referred to as the shade portion S), namely, a portion of the pixel electrode substrate 104 where orientation-regulating force to liquid crystal molecules 105a is weak, is unavoidably caused in the transmission region T on a downstream side along the rubbing direction (a right hand side in FIG. 6) of the convex 106. Therefore, a region of a liquid crystal layer 105 corresponding to this shade portion S is visually identified as a domain in the transmission display mode, which disadvantageously lowers the display quality in the transmission display mode.

In order to overcome this disadvantage, the shade portion S may be moved from the transmission region T to the reflection region R because such a domain is more difficult to identify when formed in the reflection region R than when formed in the transmission region T. In other words, the convex 106 may be shifted toward the upstream side along the rubbing direction (namely, toward the left hand side in FIG. 6).

The range of the reflection region R is, however, defined by the reflection pixel electrode part 101, and therefore, when the convex 106 is shifted toward the upstream side along the rubbing direction, the reflection pixel electrode part 101 is also shifted toward the upstream side along the rubbing direction. In other words, the reflection region R itself is shifted toward the upstream side along the rubbing direction together with the convex 106. Accordingly, unless the convex 106 can be shifted relatively to the reflection pixel electrode part 101, the shade portion S cannot be moved from the transmission region T to the reflection region R in principle.

Accordingly, as a countermeasure against the aforementioned domain, there is generally no other way than masking the domain region by using a mask layer. In this case, however, the aperture ratio of the transmission region T is unavoidably sacrificed accordingly to the masking as compared with design in which such masking is not employed.

The present invention was devised in consideration of the conventional disadvantage, and a principal object of the invention is, with respect to a transmission/reflection combination type LCD in which each pixel has a reflection region and a transmission region and the thickness of a liquid crystal layer is smaller in the reflection region than in the transmission region, providing an LCD that can suppress, without sacrificing the aperture ratio of the transmission region, lowering of the display quality in the transmission region derived from a domain formed because of a portion shaded from the rubbing processing with a convex provided for obtaining the different thicknesses of the liquid crystal layer.

In order to achieve the object, according to the present invention, attention is paid to that the reflection region is defined by the reflection pixel electrode part provided on the pixel electrode substrate. Therefore, the convex is provided not on the pixel electrode substrate but on the counter electrode substrate, and the convex is shifted relatively to the reflection pixel electrode part to the upstream side along the rubbing direction. Thus, the portion shaded from the rubbing processing with the convex can be moved from the transmission region to the reflection region.

Specifically, the liquid crystal display device of this invention includes a pixel electrode substrate having a reflection pixel electrode part and a transmission pixel electrode part with respect to each pixel; a counter electrode substrate having a counter electrode part and disposed with the counter electrode part opposing the reflection pixel electrode part and the transmission pixel electrode part of the pixel electrode substrate; and a liquid crystal layer interposed between the pixel electrode substrate and the counter electrode substrate, and each pixel has a reflection region corresponding to the reflection pixel electrode part and a transmission region corresponding to the transmission pixel electrode part, and a surface of the counter electrode substrate facing the liquid crystal layer has been rubbed in a given rubbing direction.

The counter electrode substrate has a convex for making a thickness of the liquid crystal layer smaller in the reflection region than in the transmission region, and in addition, an end of the convex on a downstream side along the rubbing direction is disposed in a position shifted toward an upstream side along the rubbing direction relatively to the reflection pixel electrode part. At this point, the shift extent of the end of the convex on the downstream side along the rubbing direction relative to the reflection pixel electrode part is preferably 1 μm or more. Herein, the "shift of the convex relative to the reflection pixel electrode part" is the relative positional relationship between the reflection pixel electrode part and the convex, and therefore, a given portion of the reflection pixel electrode part may be shifted against the convex or both the reflection pixel electrode part and the convex may be shifted against each other. However, in the case where the numerical aperture of the transmission region originally designed is desired to keep, namely, in the case where the numerical aperture of the transmission region is not sacrificed at all, a give portion of the convex is shifted against the reflection pixel electrode part literally.

In the case where the reflection pixel electrode part is formed to cross a whole region of the pixel along a direction perpendicular to the rubbing direction, the convex can be formed to cross the whole region of the pixel along the direction the same as the reflection pixel electrode part.

Furthermore, not only the end of the convex on the downstream side along the rubbing direction but also ends of the convex along a direction perpendicular to the rubbing direction may be shifted to be closer to each other relatively to the reflection pixel electrode part.

Moreover, in the case where the counter electrode substrate includes a color filter layer provided to each pixel, a transparent layer for elevating a portion of the color filter layer corresponding to the reflection region toward the reflection pixel electrode part is provided in the portion of the color filter layer corresponding to the reflection region on a side of the color filter layer not facing the liquid crystal layer, so that the convex may correspond to the portion elevated by the transparent layer.

In this case, a part of the color filter layer disposed in the reflection region may correspond to a transparent portion having higher transmissivity than the other part of the color filter layer disposed in the reflection region.

DETAILED DESCRIPTION OF THE PREFERRED EMBODIMENTS

Preferred embodiments of the invention will now be described with reference to the accompanying drawings.

Embodiment 1

Figure 1:
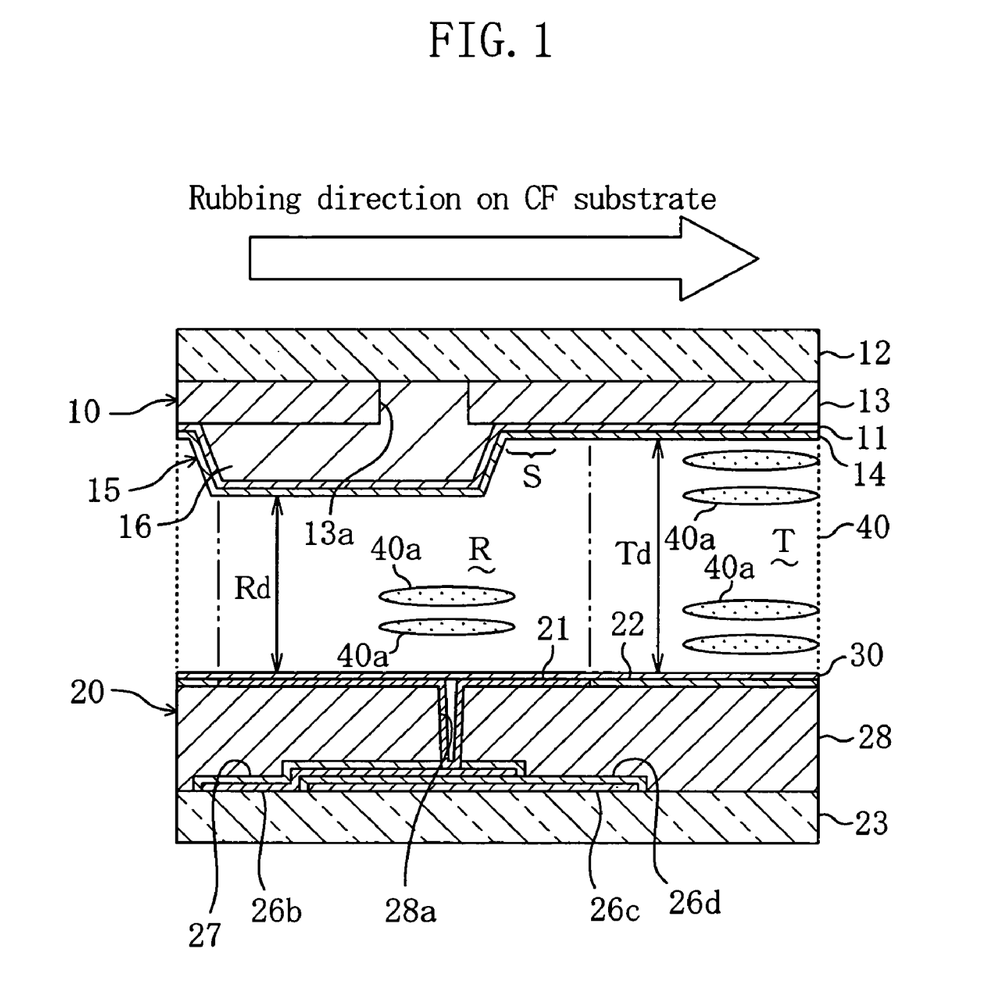
FIG. 1 is a cross-sectional view taken along line I—I of FIG. 2.
Figure 2:
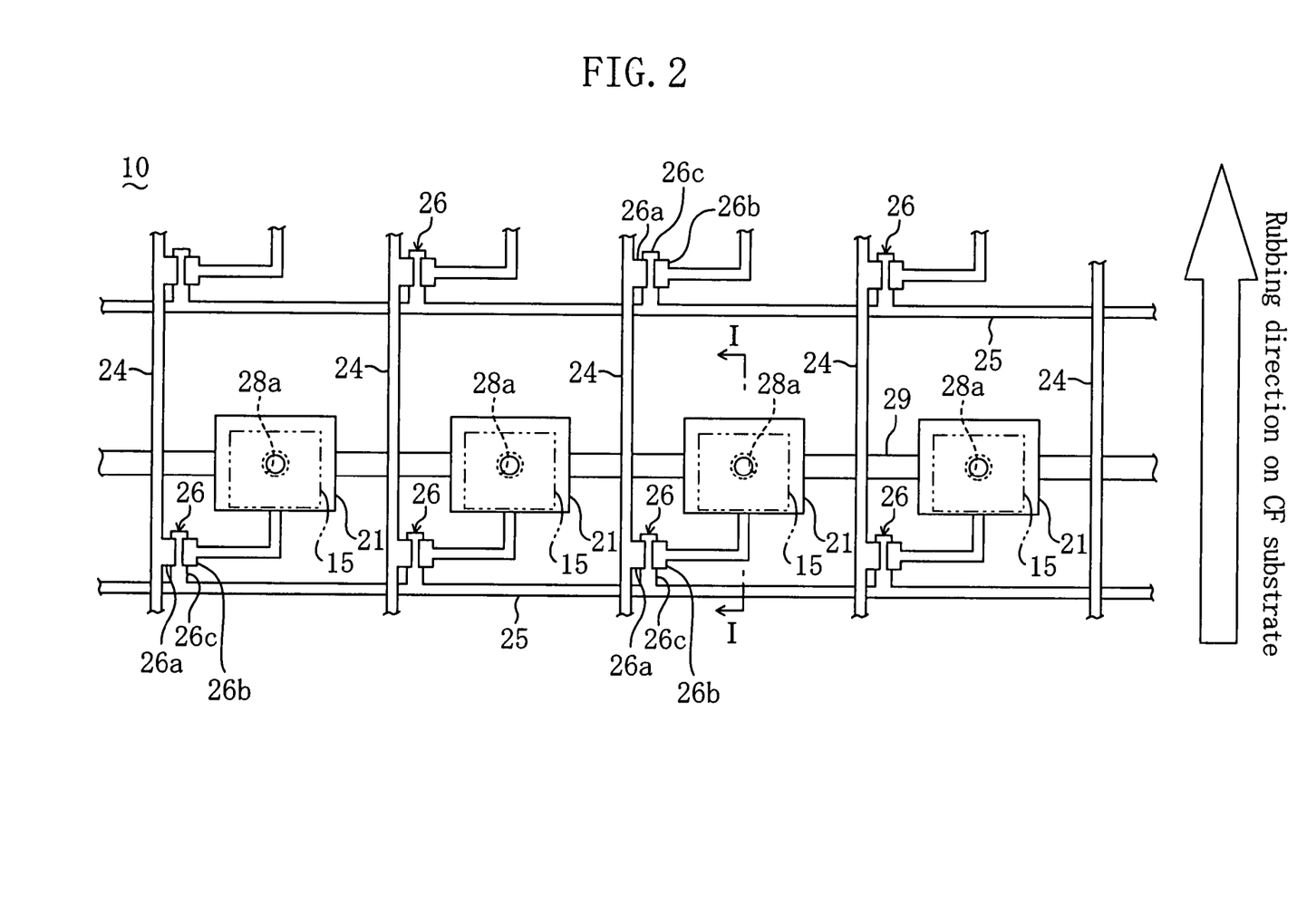
FIG. 2 is a schematic plan view of a CF substrate (i.e., a color filter substrate working as a counter electrode substrate) of a liquid crystal display panel of an LCD according to Embodiment 1 of the invention.

FIGS. 1 and 2 schematically show a main part of a liquid crystal display panel of a transmission/reflection combination type liquid crystal display device (LCD) according to Embodiment 1 of the invention, and this LCD produces displays in both a transmission display mode and a reflection display mode. FIG. 1 shows the cross-sectional structure taken along line I—I of FIG. 2, and FIG. 2 shows the plane structure of a counter electrode substrate seen from a pixel electrode substrate.

The liquid crystal display panel of this LCD includes a TFT substrate 20 that has a reflection pixel electrode part 21 and a transmission pixel electrode part 22 with respect to each pixel; and a color filter substrate 10 (hereinafter referred to as the CF substrate) that has a counter electrode part 11 and is disposed with the counter electrode part 11 opposing the reflection pixel electrode part 21 and the transmission pixel electrode part 22 of the TFT substrate 20. The counter electrode part 11 is provided so as to cover a plurality of pixels, and the reflection pixel electrode part 21 is disposed at substantially the center of each pixel and the transmission pixel electrode part 22 is disposed so as to surround the reflection pixel electrode part 21. A liquid crystal layer 40 is interposed between these substrates 10 and 20. This liquid crystal display panel is of an ECB (Electrically Controlled Birefringence) mode in which the birefringence of the liquid crystal layer 40 is utilized and incident light is controlled to transmit/cut by changing the orientation of liquid crystal molecules 40a in accordance with an electric field.

The TFT substrate 20 includes a transparent substrate 23 made from an insulating transparent material such as glass.

On the transparent substrate 23, a plurality of signal lines 24 and a plurality of scanning lines 25 are disposed so as to cross with each other in a matrix. A TFT (Thin Film Transistor) 26 including a source electrode 26a, a drain electrode 26b and a gate electrode 26c is provided in the vicinity of each crossing between the signal line 24 and the scanning line 25. A gate insulating film 26d is disposed between a combination of the source electrode 26a and the drain electrode 26b, and the gate electrode 26c. The source electrode 26a is connected to the signal line 24, and the gate electrode 26c is connected to the scanning line 25. Also, the drain electrode 26b of the TFT 26 extends to substantially the center of the pixel and is covered with a protection layer 27.

An insulating layer 28 is deposited on the signal line 24, the scanning line 25 and the TFT 26, and the reflection pixel electrode part 21 and the transmission pixel electrode part 22 are disposed on the insulating layer 28. A contact hole 28a penetrating the insulating layer 28 in the thickness direction is formed in a portion of the insulating layer 28 corresponding to substantially the center of the reflection pixel electrode part 21, so that the reflection pixel electrode part 21 can be connected to the drain electrode 26b of the TFT 26 through the contact hole 28a. Also, on the face of the insulating layer 28 facing the transparent substrate 23, a capacitor electrode line 29 for forming additional capacitance Cs for storing a signal between each of the pixel electrode parts 21 and 22 and the capacitor electrode line 29 is disposed so as to extend in parallel to the scanning line 25. The gate insulating film 26d of the TFT 26 is provided so as to extend over the capacitor electrode line 29.

The reflection pixel electrode part 21 is made from a metal reflection film, such as an aluminum (Al) film, having a light reflection function and an electrode function, and a region of the liquid crystal layer 40 corresponding to the reflection pixel electrode part 21 is defined as a reflection region R used in the reflection display mode. On the other hand, the transmission pixel electrode part 22 is made from a transparent conducting film of, for example, ITO (Indium Tin Oxide) having a light transmission function and an electrode function, and is connected, at its inner edge, to the edge of the metal reflection film working as the reflection pixel electrode part 21. A region of the liquid crystal layer 40 corresponding to the transmission pixel electrode part 22 is defined as a transmission region T used in the transmission display mode. Although the metal reflection film of the reflection pixel electrode part 21 and the transparent conducting film of the transmission pixel electrode part 22 are connected to each other with their edges butted against each other in this embodiment, the metal reflection film and the transparent conducting film can be connected to each other with their edges overlapped. Alternatively, the transparent conducting film may be disposed also in the reflection region R with a metal reflection film deposited on the transparent conducting film in the reflection region, so that the reflection pixel electrode part 21 may be composed of a combination of the transparent conducting film disposed in the reflection region and the metal reflection film. Alternatively, with the transparent conducting film disposed also in the reflection region R, a reflection film at least having a light reflection function is disposed below the transparent conducting film in the reflection region, so that the reflection pixel electrode part 21 may be composed of a combination of the transparent conducting film disposed in the reflection region and the reflection film.

An alignment layer 30 having been rubbed in a predetermined direction is provided on the reflection pixel electrode part 21 and the transmission pixel electrode part 22, so that the liquid crystal molecules 40a present in the vicinity of the interface between the liquid crystal layer 40 and the TFT substrate 20 can be oriented in parallel to the TFT substrate 20 and in the predetermined direction.

On the other hand, the CF substrate 10 also includes a transparent substrate 12 made from an insulating transparent material such as glass. A color filter layer 13 is provided with respect to each pixel on the face of the transparent substrate 12 facing the liquid crystal layer 40. At this point, an opening 13a working as a colorless portion penetrating the color filter layer 13 in the thickness direction is provided in a portion of the color filter layer 13 corresponding to substantially the center of the reflection pixel electrode part 21. The counter electrode part 11 is provided on the color filter layer 13. This counter electrode part 11 is made from a transparent conducting film of ITO or the like similarly to the transparent pixel electrode part 22. An alignment layer 14 having been rubbed in a direction shown with an arrow in each of FIGS. 1 and 2 is provided on the counter electrode part 11, so that the liquid crystal molecules 40a present in the vicinity of the interface between the liquid crystal layer 40 and the CF substrate 10 can be oriented in parallel to the CF substrate 10 and in the direction shown with the arrow.

In this embodiment, the CF substrate 10 has a convex 15 for making the thickness Rd of the liquid crystal layer 40 in the reflection region R smaller than the thickness Td of the liquid crystal layer 40 in the transmission region T (Rd<Td).

Specifically, between a portion of the color filter layer 13 and a portion of the counter electrode part 11 both corresponding to the reflection region R, a transparent layer 16 is provided so as to elevate the portion of the counter electrode part 11 corresponding to the reflection region R toward the reflection pixel electrode part 21 provided on the TFT substrate 20, and the convex 15 corresponds to the portion elevated by this transparent layer 16. Also, the opening 13a of the color filter layer 13 is filled with a part of the transparent layer 16. Such a transparent layer 16 is formed, for example, as follows: A film made from a negative transparent acrylic resin-based photosensitive material is formed on the transparent substrate 12, the photosensitive material is patterned into a desired shape through exposure to activation light, the resultant is developed with an alkaline developer and cleaned with water so as to remove an unexposed portion of the film, and annealing is ultimately performed. Alternatively, the transparent layer can be formed through patterning by etching, printing, transferring or the like.

In addition, in this embodiment, the end of the convex 15 on the downstream side along the rubbing direction (namely, the right end in FIG. 1; hereinafter referred to as the downstream end) is disposed in a position shifted to the upstream side along the rubbing direction (namely, to the left hand side in FIG. 1) from the boundary between the transmission region T and the reflection region R shown with a virtual line as shown in FIG. 1. (It is noted that words "downstream" and "upstream" herein mean directions along the rubbing direction.) Therefore, a shade portion S shaded from the rubbing processing with the convex 15, that is, a portion in the vicinity of and on the downstream side of the convex 15, is positioned on the side of the reflection region R (on the left hand side in FIG. 1).

More specifically, since the convex 15 is provided not on the TFT substrate 20 but on the CF substrate 10, the convex 15 can be shifted relatively to the reflection region R defined by the reflection pixel electrode part 21 disposed on the TFT substrate 20. Since the downstream end of the convex 15 is shifted to the upstream side relatively to the reflection pixel electrode part 21, at least a part of the shade portion S, namely, the portion in the vicinity of and on the downstream side of the convex 15, is moved from the transmission region T to the reflection region R. Therefore, at least a part of a domain formed in a region of the liquid crystal layer 40 correspondingly to and because of the shade portion S is accordingly moved from the transmission region T to the reflection region R, and hence, the lowering of display quality in the transmission region T derived from such a domain can be suppressed accordingly to the shift, and in addition, the numerical aperture of the transmission region T is never sacrificed.

Furthermore, in this embodiment, in addition to the downstream end of the convex 15, both ends (the right and left ends in FIG. 2) of the convex 15 along a direction perpendicular to the rubbing direction are shifted to be closer each other (i.e., in the lateral direction in FIG. 2) relatively to the reflection pixel electrode part 21, and hence, portions in the vicinity of and on the both sides of the convex 15 that are difficult to sufficiently rub can be positioned on the side of the reflection region R. It is noted that the end of the convex 15 on the upstream side is disposed in the same position along the rubbing direction as the corresponding end of the reflection pixel electrode part 21 in this embodiment in the same manner as in the conventional technique.

Specifically, the transparent layer 16 is formed to have a rectangular plane shape smaller than that of the reflection pixel electrode part 21, and thus, the ends of the convex 15 can be shifted toward the reflection region R. The shift extent M of each end of the convex 15 is at least 1 μm or more (M≧1 μm) and preferably 2 μm or more (M≧2 μm). In other words, in the case where the respective thicknesses Rd and Td of the liquid crystal layer 40 in the reflection region R and the transmission region T have general values, the dimension of the domain formed because of the shade portion S from the downstream end of the convex (i.e., the rubbing direction dimension of the domain) largely depends upon the height of the convex 15 and is regarded to be varied also in accordance with various factors such as the liquid crystal material, the alignment layer and rubbing conditions. However, it has been found through an experiment as described below that the rubbing direction dimension of the domain is not within 1 μm. Therefore, when the shift extent M of the downstream end of the convex 15 relatively to the reflection pixel electrode part 21 is 1 μm or more (M≧1 μm), at least a part of the domain formed because of the shade portion S of the convex 15 can be moved from the transmission region T to the reflection region R.

Thus, according to this embodiment, in the transmission/reflection combination type LCD in which each pixel includes the reflection region R and the transmission region T and the liquid crystal layer 40 has the thickness Rd in the reflection region R smaller than the thickness Td in the transmission region T, the convex 15 formed on the CF substrate 10 for making the thicknesses Rd and Td different from each other is provided so as to have its downstream end in the position shifted toward the upstream side relatively to the reflection pixel electrode part 21 disposed on the TFT substrate 20. Therefore, at least a part of the domain formed in the region of the liquid crystal layer 40 correspondingly to and because of the shade portion S formed on the downstream side of the convex 15 can be moved from the transmission region T where such a domain is easily seen to the reflection region R where it is difficult to see. As a result, without scarifying the numerical aperture of the transmission region T, the lowering of the display quality derived from such a domain can be suppressed.

Furthermore, in addition to the downstream end of the convex 15, the ends of the convex 15 along the direction perpendicular to the rubbing direction are shifted to be closer to each other relatively to the reflection pixel electrode part 21. Therefore, also domains formed in regions of the liquid crystal layer 40 correspondingly to and because of shade portions S formed in the vicinity of and on the both sides of the convex 15 that are difficult to sufficiently rub can be also moved from the transmission region T to the reflection region R. Accordingly, the lowering of the display quality also derived from such domains can be suppressed without sacrificing the numerical aperture of the transmission region T.

Moreover, the convex 15 is formed by providing the transparent layer 16 between the transparent substrate 12 and the color filter layer 13. Therefore, the convex 15 can be formed without increasing the thickness of the color filter layer 13, and hence, lowering of the transmissivity in the reflection region R derived from a large thickness of the color filter layer 13 can be avoided.

Furthermore, the opening 13a is formed in a part of the color filter layer 13 in the reflection region R and the material for the transparent layer 16 is filled in the opening 13a. Therefore, this opening 13a can be a transparent portion with higher transmissivity than the other portion of the color filter layer 13, which can rather increase the transmissivity in the reflection region R. In addition, the function of the color filter layer 13 is not largely spoiled.

Although the reflection pixel electrode part 21 is disposed in the same position along the thickness direction as the transmission pixel electrode part 22 so as to make flat the face of the TFT substrate 20 facing the liquid crystal layer 40 in this embodiment, the present invention does not exclude the reflection pixel electrode part 21 formed in a projecting shape as in the conventional technique. However, in the case where the reflection pixel electrode part 21 is formed in a projecting shape, the size and the shape of the projecting portion should be designed so that the TFT substrate 20 can be sufficiently rubbed.

Also, the transmission display mode and the reflection display mode are both employed for producing a display by electrically connecting the reflection pixel electrode part 21 and the transmission pixel electrode part 22 to each other in this embodiment. However, without connecting the reflection pixel electrode part 21 and the transmission pixel electrode part 22 to each other, a signal from the signal line 24 can be alternatively supplied to either the reflection pixel electrode part 21 or the transmission pixel electrode part 22 for producing a display in a mode switched between the transmission display mode and the reflection display mode.

Furthermore, although the LCD for producing a color display is described in this embodiment, the present invention is applicable to an LCD for producing a monochrome display.

-Experiment—

Now, an experiment performed for examining the relationship between the thickness Wd of the transparent layer 16 (namely, the height of the convex 15) and the dimension along the rubbing direction of the domain formed because of the shade portion S of the convex 15 will be described.

Specifically, three liquid crystal display panel models of Experiment Examples 1 through 3 in which the thicknesses of the transparent layers 16 are different in accordance with the thicknesses Rd and Td of the liquid crystal layers 40 in the reflection region R and the transmission region T are fabricated, and the rubbing direction dimension of the domain is measured in each example.

In Experiment Example 1, the thicknesses Rd and Td of the liquid crystal layer 40 in the reflection region R and the transmission region T are set to 2.5 μm and 5.0 μm, respectively, and therefore, the thickness Wd of the transparent layer 16 is set to 2.5 μm.

In Experiment Example 2, the thicknesses Rd and Td of the liquid crystal layer 40 in the reflection region R and the transmission region T are set to 3.0 μm and 4.0 μm, respectively, and therefore, the thickness Wd of the transparent layer 16 is set to 1.0 μm.

In Experiment Example 3, the thicknesses Rd and Td of the liquid crystal layer 40 in the reflection region R and the transmission region T are set to 2.0 μm and 5.5 μm, respectively, and therefore, the thickness Wd of the transparent layer 16 is set to 3.5 μm.

The conditions and the results of the experiment are both listed in the following table:

|  | Experiment Example 1 | Experiment Example 2 | Experiment Example 3 |
|---|---|---|---|
| Td in region T | 5.0 μm | 4.0 μm | 5.5 μm |
| Rd in region R | 2.5 μm | 3.0 μm | 2.0 μm |
| Wd of transparent layer | 2.5 μm | 1.0 μm | 3.5 μm |
| Dimension of domain | 2.0 μm | 1.0 μm | 3.0 μm |

As is understood from the table, the rubbing direction dimension of the domains obtained in Experiment Examples 1 through 3 are 2.0 μm, 1.0 μm and 3.0 μm, respectively. Accordingly, it is understood that the shift extent M of the convex 15 should be 1 μm or more (M≧1 μm).

In Experiment Example 1, it is assumed that the domain is masked by using a mask layer having an area corresponding to the area of the shade portion S of convex 15 instead of moving the domain completely to the reflection region R by shifting the downstream end of the convex 15 toward the upstream side by 2 μm. Under this assumption, a loss ratio of the numerical aperture Pa of the transmission region T obtained in using the mask layer to the numerical aperture Pb originally obtained without using the mask layer, [(Pb−Pa)/Pb], is calculated. When the original numerical aperture obtained without using the mask layer is approximately 60%, the loss ratio is approximately 1.5%. In suppressing the lowering of the display quality in the transmission region T derived from the domain, the means of this invention of shifting the downstream end of the convex 15 toward the upstream side is more remarkably effective as the original numerical aperture Pb of the transmission region T is designed to be lower because the area of the shade portion S of the convex 15 is substantially constant.

Embodiment 2

Figure 3:
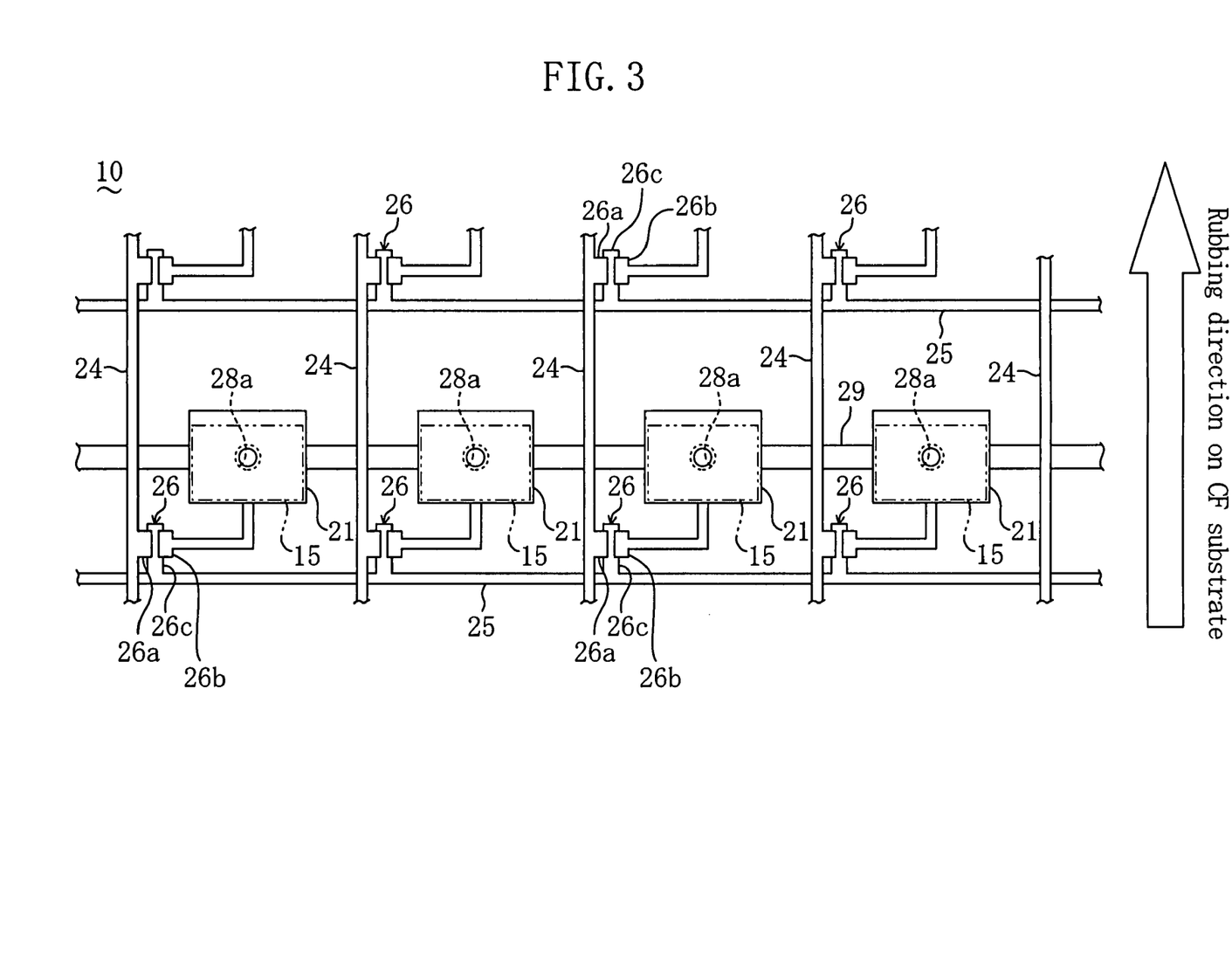
FIG. 3 is a schematic plan view of a CF substrate of a liquid crystal display panel of an LCD according to Embodiment 2 of the invention.

FIG. 3 shows the plane structure of a main part of a CF substrate 10 used in a liquid crystal display panel of an LCD according to Embodiment 2 of the invention. In FIG. 3, like reference numerals are used to refer to like elements used in Embodiment 1.

In this embodiment, the downstream end of the convex 15 (namely, the upper end in FIG. 3) alone is shifted but both ends of the convex 15 along the direction perpendicular to the rubbing direction (namely, the right and left ends in FIG. 3) are not shifted but disposed in positions substantially overlapping the corresponding ends of the reflection pixel electrode part 21 as in the conventional technique. Apart from this, the structure of this LCD is the same as that of Embodiment 1, and hence the description is herein omitted.

Accordingly, this embodiment can exhibit the same effect as that of Embodiment 1 except that the lowering of the display quality derived from the domains formed in the regions of the liquid crystal layer 40 correspondingly to and because of the portions in the vicinity of and on both the sides of the convex 15 that are difficult to sufficiently rub cannot be suppressed.

Embodiment 3

Figure 4:
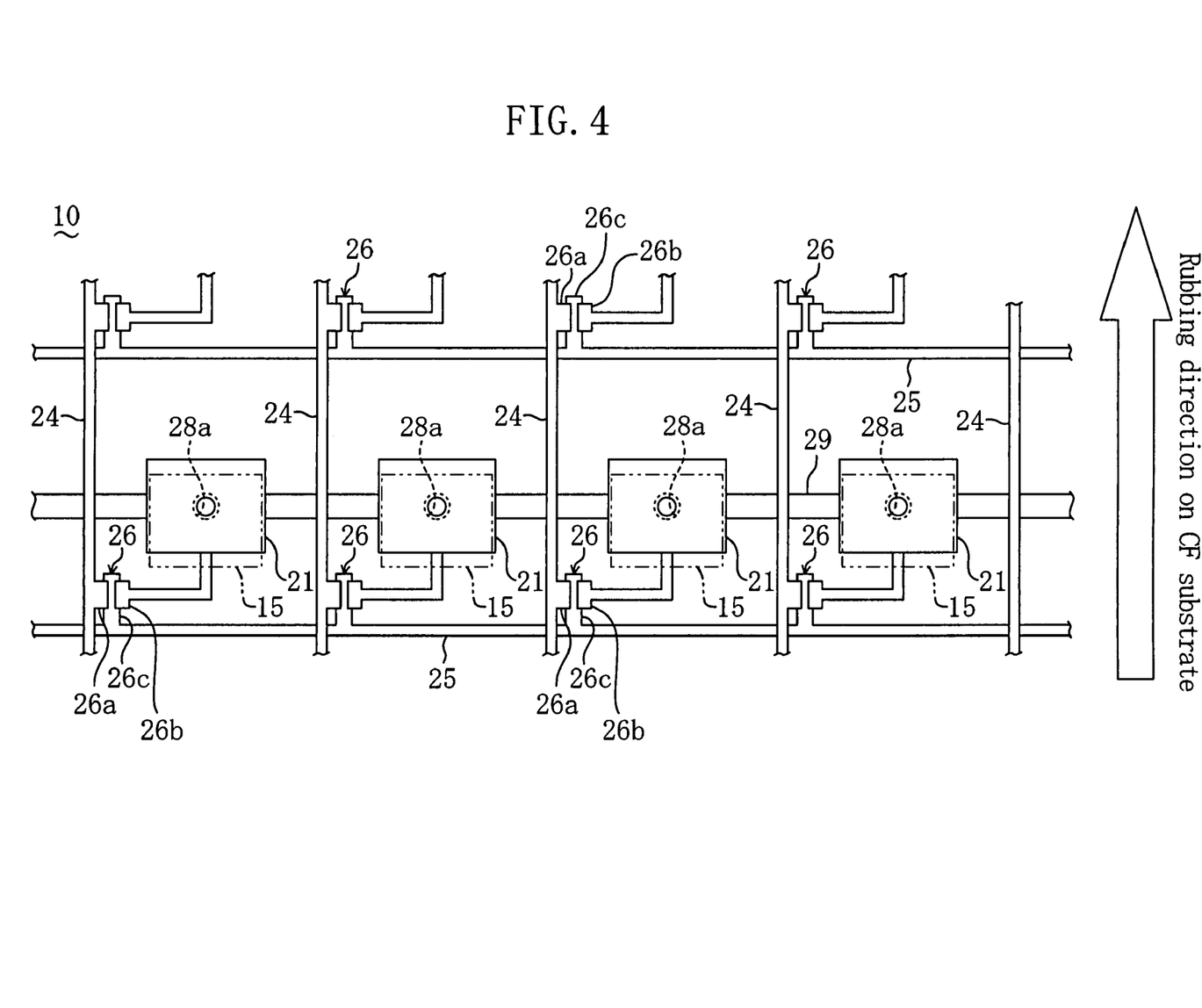
FIG. 4 is a schematic plan view of a CF substrate of a liquid crystal display panel of an LCD according to Embodiment 3 of the invention.

FIG. 4 shows the plane structure of a main part of a CF substrate 10 used in a liquid crystal display panel of an LCD according to Embodiment 3 of the invention. In FIG. 4, like reference numerals are used to refer to like elements used in Embodiment 1.

In this embodiment, not only the downstream end of the convex 15 (namely, the upper end in FIG. 4) but also the end of the convex 15 on the upstream side (namely, the lower end in FIG. 4) is shifted toward the upstream side relatively to the reflection pixel electrode part 21, and the shift extent of the latter end is the same as that of the former end. Also, both ends of the convex 15 along the direction perpendicular to the rubbing direction (namely, the right and left ends in FIG. 4) are disposed in positions substantially overlapping the corresponding ends of the reflection pixel electrode part 21 as in Embodiment 2.

In other words, the plane shape and the size of the transparent layer 16 used for forming the convex 15 are substantially the same as those of the reflection pixel electrode part 21, and the convex 15 in such shape and size is shifted as a whole. In this case, the end of the convex 15 on the upstream side is present in the transmission region T, and hence, the thickness of the liquid crystal layer 40 in the transmission region T is changed. Therefore, although a region having a rather different electro-optical characteristic is formed, this region does not lead to a problem in the visibility. Accordingly, there is no need to mask the region with a mask layer, and hence, the numerical aperture of the transmission region T is not sacrificed. Apart from this, the structure of the LCD of this embodiment is the same as that of Embodiment 1 and hence the description is herein omitted.

Accordingly, also this embodiment can exhibit the effect the same as that of Embodiment 2. In addition, the shape and the size of the transparent layer 16 can be easily set at the step of panel design, and the alignment of the CF substrate 10 and the TFT substrate 20 can be eased at a panel alignment step for placing the substrate 10 on the substrate 20.

Figure 5:
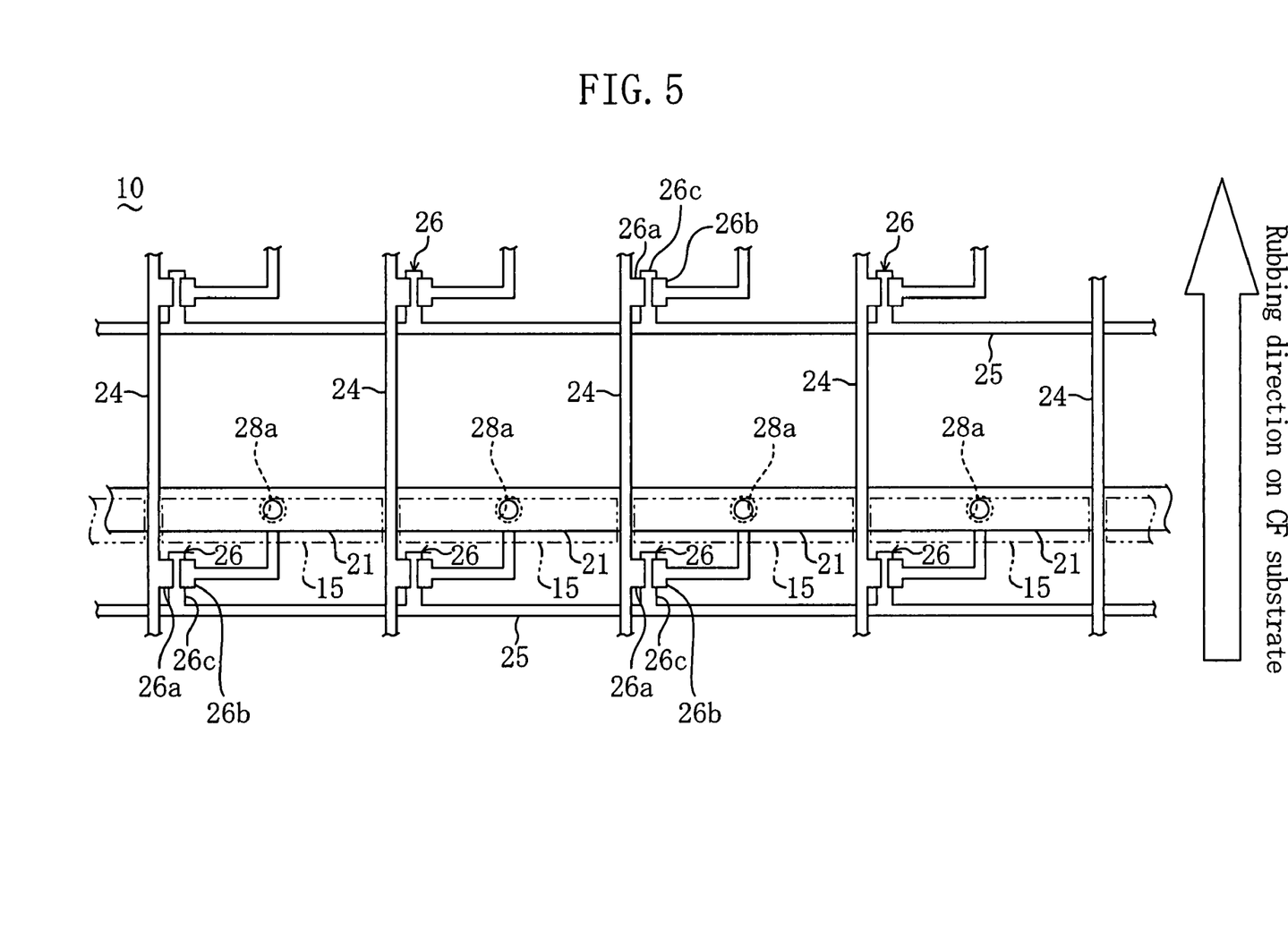
FIG. 5 is a schematic plan view of a CF substrate of a liquid crystal display panel of an LCD according to a modification of Embodiment 3 of the invention.

A modification of this embodiment is shown in FIG. 5, which is a plan view of a main part on a CF substrate 10. As shown in FIG. 5, a reflection pixel electrode part 21 disposed on a TFT substrate 20 is formed so as to extend over the whole region of each pixel along the direction parallel to a scanning line 25, and convexes 15, namely, transparent layers 16, disposed on the CF substrate 10 are formed in the shape of continuous stripes crossing the whole region of each pixel along the direction parallel to the scanning line 25 over a plurality of pixels arranged along the direction of the scanning line 25. In this case, the whole convex 15 can be formed to be shifted toward the upstream side relatively to the reflection pixel electrode part 21 of each pixel. Therefore, in positioning the convex 15 relatively to the reflection pixel electrode part 21 at the panel alignment step, there is no need to control the position along the direction perpendicular to the rubbing direction, and hence, the positioning work can be eased. It is noted that the position along the rubbing direction should be still controlled.

What is claimed is:

1. A liquid crystal display device comprising:
   a pixel electrode substrate having a reflection pixel electrode part and a transmission pixel electrode part with respect to each pixel;
   a counter electrode substrate having a counter electrode part and disposed with the counter electrode part opposing the reflection pixel electrode part and the transmission pixel electrode part of the pixel electrode substrate; and
   a liquid crystal layer interposed between the pixel electrode substrate and the counter electrode substrate,
   wherein each pixel has a reflection region corresponding to the reflection pixel electrode part and a transmission region corresponding to the transmission pixel electrode part,
   a surface of the counter electrode substrate facing the liquid crystal layer has been rubbed in a given rubbing direction,
   the counter electrode substrate has a convex for making a thickness of the liquid crystal layer smaller in the reflection region than in the transmission region, and
   an end of the convex on a downstream side along the rubbing direction is disposed in a position shifted toward an upstream side along the rubbing direction relatively to the reflection pixel electrode part.

2. The liquid crystal display device of claim 1, wherein shift extent of the end of the convex on the downstream side along the rubbing direction relative to the reflection pixel electrode part is 1 µm or more.

3. The liquid crystal display device of claim 1, wherein the reflection pixel electrode part is formed to cross a whole region of the pixel along a direction perpendicular to the rubbing direction, and the convex is formed to cross the whole region of the pixel along the direction the same as the reflection pixel electrode part.

4. The liquid crystal display device of claim 1, wherein not only the end of the convex on the downstream side along the rubbing direction but also ends of the convex along a direction perpendicular to the rubbing direction are shifted to be closer to each other relatively to the reflection pixel electrode part.

5. The liquid crystal display device of claim 1, wherein the counter electrode substrate includes a color filter layer provided to each pixel, and
   a transparent layer for elevating a portion of the color filter layer corresponding to the reflection region toward the reflection pixel electrode part is provided in the portion of the color filter layer corresponding to the reflection region on a side of the color filter layer not facing the liquid crystal layer, and the convex corresponds to the portion elevated by the transparent layer.

6. The liquid crystal display device of claim 5, wherein a part of the color filter layer disposed in the reflection region corresponds to a transparent portion having higher transmissivity than the other part of the color filter layer disposed in the reflection region.

* * * * *